March 14, 1961 J. R. HANKINS 2,974,940
SCALE AND ADAPTOR THEREFOR
Filed April 8, 1959 2 Sheets-Sheet 1

INVENTOR
JAMES RICHARD HANKINS
BY
ATTORNEYS

March 14, 1961 J. R. HANKINS 2,974,940
SCALE AND ADAPTOR THEREFOR
Filed April 8, 1959 2 Sheets-Sheet 2
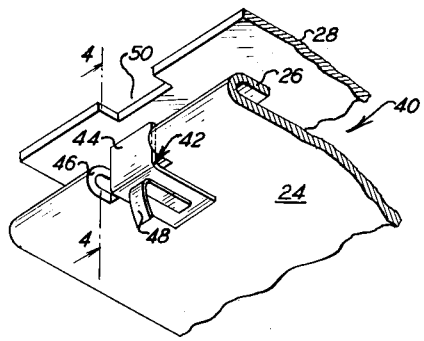
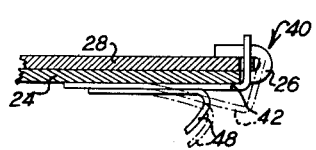
Fig.4
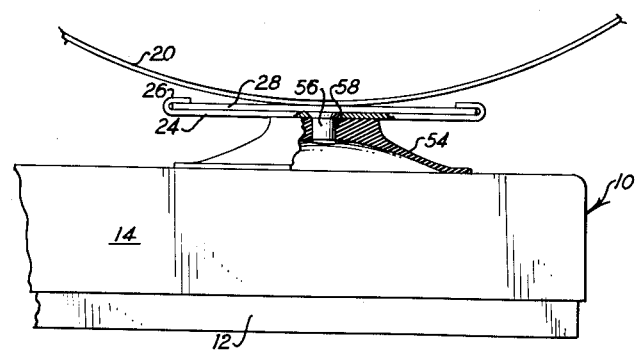
Fig.3
Fig.5
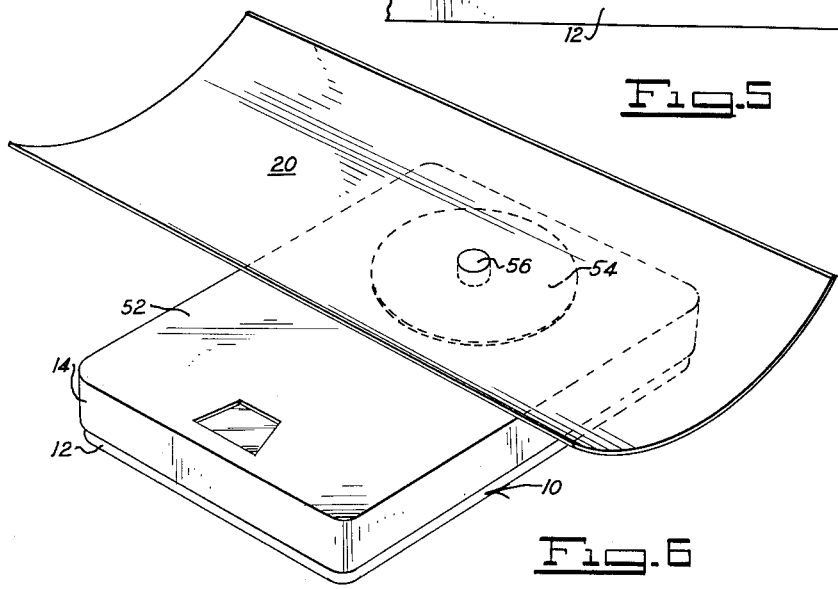
Fig.6
INVENTOR
JAMES RICHARD HANKINS
BY Jacobi & Jacobi
ATTORNEYS

United States Patent Office 2,974,940
Patented Mar. 14, 1961

2,974,940

SCALE AND ADAPTOR THEREFOR

James Richard Hankins, 2965 Cleveland Ave., Columbus 24, Ohio

Filed Apr. 8, 1959, Ser. No. 804,930

2 Claims. (Cl. 265—73)

This invention relates to scales, and more particularly to arrangements for adapting scales for different uses.

It is one of the principal objects of the invention to provide an improved scale arrangement whereby, for example, a bathroom scale can be adapted for use as a baby scale.

A further object of the invention is to provide for adapting a scale having conventional use for one particular type of weighing operation to weighing operations of a different type so that the need is avoided of purchasing and maintaining separate scales for the different types of weighing operations.

Still another object of the invention is to provide baby scales at minimum cost by utilizing the weighing mechanisms of conventionally available equipment.

To achieve the above and other of its objectives, the invention contemplates the provision of adaptors whereby a cradle, tray or the like may be coupled to the weighing mechanism of an available scale.

According to one feature of the invention, a conventional scale is modified for accommodating supporting posts which in turn support, for example, a cradle. According to another feature of the invention, the adaptor member is supported by means of a suction cup or some such apparatus.

Advantageously, the invention proposes the use of an adaptor which itself can be provided in separable parts. This enables any number of different trays, cradles and the like to be superposed appropriately on a conventional scale which is thereby adapted to very many uses.

Other objects, features and advantages of the invention will be found in the following detailed description, as illustrated by the accompanying drawings, in which:

Fig. 3 illustrates, partially broken away, a locking mechanism constituting a detail of the structure of Figs. 1 and 2;

Fig. 4 is a sectional view, partially broken away and taken along the line 4—4 of Fig. 3, with the members of Fig. 3 locked together;

Fig. 5 is a partially sectional view from the side of a portion of a scale with an adaptor, constituting a second embodiment of the invention; and Fig. 6 is a perspective view of the embodiment of the invention illustrated in Fig. 5.

In accordance with the invention, a conventional scale, such as a bathroom scale, is provided with an adaptor arrangement which accommodates articles or items which would not normally be placed upon the scale for being weighed thereby.

Figure 1:
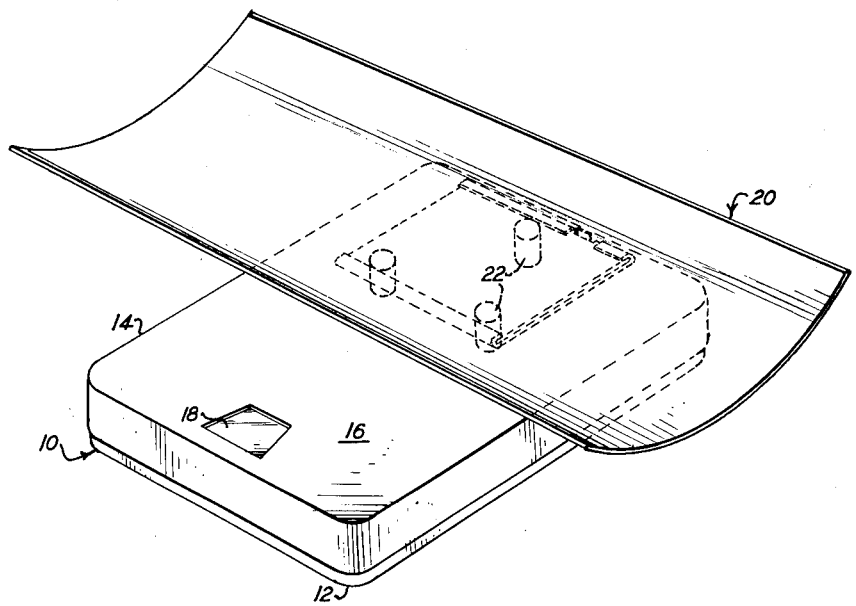
Fig. 1 illustrates in perspective view a bathroom scale provided with an adaptor in accordance with one embodiment of the invention.

The embodiment of the invention illustrated in Fig. 1 makes certain modifications of the conventional scale to provide a preferred type of accommodation for the adaptor to be used therewith.

Figure 2:
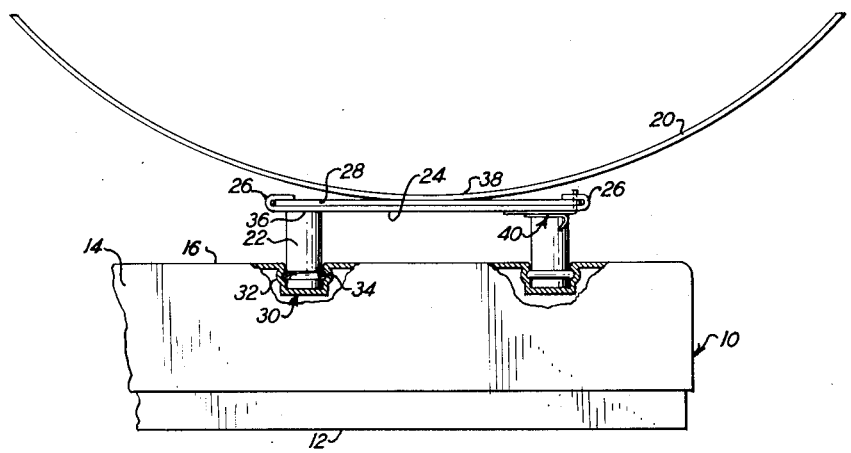
Fig. 2 illustrates in side elevational view, partially broken away, the structure of Fig. 1.

In Figs. 1 and 2 is shown a conventional scale 10, including a base member 12 and a displaceable or weight supporting member 14. Conventionally, an article or item having a determinable weight is placed on the surface 16 of the displaceable member 14, and the weight of the article being weighed causes the member 14 to be displaced vertically and downwardly with respect to the base member 12, the displacement of member 14 providing a measurement which is reflected by an indicator 18 in the form of weight units, such as pounds, kilograms and so forth.

If the scale 10 is a conventional bathroom scale, it is normally provided with a surface 16, which is flat or at most rippled or slightly corrugated, in order to provide a gripping surface for the feet of the scale operator. The body of the scale operator in this instance constitutes the article or item to be weighed, and the feet of the operator constitute the articles or items to be applied to the surface 16.

It is the purpose of this specific embodiment of the invention to adapt the scale 10 for selective use as a baby scale. Thus, in accordance with this embodiment of the invention, the weighing mechanism (not shown) of the scale 10 may have a multiplicity of uses. It can be employed for weighing one type of article; i.e., the adult or mobile human being, or it can be employed for weighing other types of articles; i.e., babies which are not mobile and which must be provided with a special type of accommodation for preventing injury.

The adaptor illustrated in Figs. 1 and 2 comprises a cradle or concave tray 20, which is shown in simplified form in the drawing. It is obvious that the tray 20 can be given any desired configuration or surface, but if this element is to provide for a function other than that generally performed by the surface 16 of displaceable member 14, the tray 20 will be provided with a different type of surface or shape so as to accommodate a different type of article.

The adaptor of Figs. 1 and 2 also comprises a plurality of posts 22. Posts 22 are rigidly affixed to a plate 24, the ends of which are provided with flanges 26. Flanges 26 accommodate a second plate 28 in face-to-face abutting relationship with the plate 24. To separate the plates 24 and 28, it is necessary to displace these members longitudinally of one another, in a manner which will be hereinafter described in greater detail.

The displaceable member 14 is provided with a plurality of receptacles 30, which are formed at the surface 16 by a stamping or like operation. Preferably, receptacles 30 are provided with annular grooves 32 which accommodate split rings 34. Split rings 34 are, in turn, accommodated in peripheral annular grooves appropriately located on posts 22, so that when the posts 22 are inserted into the receptacles, they are yieldably locked therein. It will be noted in Fig. 1 that the posts 22 are accommodated in receptacles located at one end of the surface 16. This is for the reason that this end of the surface 16 constitutes the preferred loading zone of the scale 10 when the same is used conventionally as a bathroom scale.

As indicated generally above, posts 22 are rigidly affixed to plate 24, and more specifically this is effected by an operation such as welding or the like at 36. Plate 28 is affixed to the tray 20 by welding or a like operation at 38. When plates 24 and 28 are engaged with each other, as illustrated in Figs. 1 and 2, they may be selectively locked together by means of a locking mechanism 40, which constitutes a means for detachably connecting the said plates.

Locking mechanism 40 is shown in greater detail in Figs. 3 and 4, wherein are illustrated plates 24 and 28 and the additional provisions made thereupon. Also shown clearly in Figs. 3 and 4 is one of the flanges 26 running along one of the edges of the plate 24.

The locking mechanism 40 consists of a lug 42 yieldably mounted on the plate 24 in the form of a cantilever. The lug 42 has preferably the shape of L, the tongue 44 of which extends upwardly through a slot 46 provided in the plate 24 and its flange 26. On the lug 42 is positioned a grip 48 provided so that the tongue 44 can be manually retracted through the slot 46.

The tongue 44 is intended to engage a slot 50 provided along an edge of the plate 28. It will be appreciated that an engagement between the plate 24 and the plate 28 results automatically when the tongue 44 is permitted to assume its normal uppermost position, as illustrated in Fig. 3, when the slot 50 is appropriately positioned within the confines of the associated flange 26. Fig. 4 illustrates in solid line the position of lug 42 with tongue 44 in engagement with slot 50, and in chain line the position of lug 42 which will enable the plates 24 and 28 to be disengaged.

It is to be understood that the locking means 40 can be replaced by other locking mechanisms, the function of which is to permit the plates 24 and 28 to be locked selectively together. It will as well be appreciated that, if desired, the tray 20 can be connected integrally with the posts 22 for connection to the scale 10. The provision, however, of detachable plates 24 and 28 permits the substitution for tray 20 of various other types of accommodation, so that the scale 10 may be modified for many different purposes. For example, specific different types of trays 20 may be provided for weighing such articles or items as groceries, laundry, paper, hardware, and so forth.

Figs. 5 and 6 indicate a second embodiment of the invention, wherein the scale 10 is provided with a planar upper surface 52. In Figs. 5 and 6, the elements corresponding with those of Figs. 1–4 are indicated by the same reference numerals and perform the same functions.

The difference of the embodiment of Figs. 5 and 6 resides essentially in the fact that the plate 24 is coupled to the surface 52 by means of a suction cup 54. To this end, a bolt or rivet 56 is rigidly affixed to the plate 24 and is accommodated in a bore 58 in the head of the suction cup. The suction cup adheres to the flat surface 52 in a manner known per se, thus connecting the tray 20 to the displaceable member 14. It will be noted that, in addition to the advantages inuring to the benefit of the embodiment of Figs. 1–4, the use of the suction cup 54 provides an inherent resiliency in the support, which will make the use of the tray 20 more comfortable for babies.

It may be concluded from what has been stated above that the invention, in accordance with one aspect thereof, provides for an adaptor member applicable to a conventional scale and providing a working surface or accommodation different from that of the conventional scale, so that a scale may be adapted for multiple applications. It is to be observed that the surface provided by the adaptor is generally superposed with respect to the working surface of the conventional scale, so that the gravitational forces acting on the working mechanism of the scale involve no undue complexities. Conventional scales, furthermore, are generally provided with indicator adjusting devices (not shown), which may be utilized to zeroize the indicator to account for the additional weight caused by the adaptor mechanism on the weighing mechanism.

In providing, for example, means for modifying a conventional bathroom scale for use as a baby scale, the invention achieves its objective of rendering a scale, having frequent use for one type of weighing operation, fit for use in weighing operations generally of far less frequent occurrence. It is, therefore, unnecessary for the consumer to purchase a second scale for this second function.

There will now be obvious to those skilled in the art many modifications and variations of the structures set forth. These modifications and variations will not, however, depart from the scope of the invention, as defined in the following claims.

What is claimed is:

1. A scale assembly comprising a base member, a member vertically and resiliently displaceable on said base member and having a flat surface for supporting articles to be weighed, first means for detachably engaging the displaceable member and transferring substantially vertical forces thereto, a cradle adapted for accommodating articles to be weighed, and second means on said cradle for detachable connection to the first means with the cradle superposed over said surface whereby said surface and cradle may be selectively employed for weighing operations; said first and second means each including a plate one of which is flanged for slidably accommodating the other, one of the plates having a slot and the other including a yieldable lug for engaging the slot and locking said plates together.

2. A scale assembly comprising a base member, a member vertically and resiliently displaceable on said base member and having a flat surface for supporting articles to be weighed, sockets in the upper surface of said displaceable member, an annular groove in the wall of each socket, first means having posts for detachably engaging said sockets in the displaceable member, said posts providing the sole means for transmitting vertical forces between said displaceable member and said first means, an annular groove in the outer surface of each post, snap rings received in said grooves for detachably retaining said posts in said sockets, a cradle adapted for accommodating articles to be weighed, and second means on said cradle for detachable connection to the first means with the cradle superposed over said surface whereby said surface and cradle may be selectively employed for weighing operations, said assembly further comprising locking means for locking the first and second means together.

References Cited in the file of this patent

UNITED STATES PATENTS

| | | |
|---|---|---|
| 1,275,911 | Hansen | Aug. 13, 1918 |
| 1,563,521 | Pearson | Dec. 1, 1925 |
| 1,644,683 | Liepert | Oct. 11, 1927 |
| 1,728,988 | Younger et al. | Sept. 24, 1929 |
| 2,317,889 | Danneman | Apr. 27, 1943 |
| 2,363,436 | Pancoe | Nov. 21, 1944 |